US006456046B1

United States Patent
Gaza

(12) United States Patent
(10) Patent No.: US 6,456,046 B1
(45) Date of Patent: Sep. 24, 2002

(54) PROTECTION CIRCUIT FOR TERMINATING TRICKLE CHARGE WHEN THE BATTERY TERMINAL VOLTAGE IS GREATER THAN A PREDETERMINED VALUE

(75) Inventor: Brian Scott Gaza, Naperville, IL (US)

(73) Assignee: International Components Corporation, Chicago, IL (US)

( * ) Notice: Subject to any disclaimer, the term of this patent is extended or adjusted under 35 U.S.C. 154(b) by 0 days.

(21) Appl. No.: 09/748,627

(22) Filed: Dec. 22, 2000

(51) Int. Cl.$^7$ ............................................... H01M 10/46

(52) U.S. Cl. ....................................... 320/155; 320/160

(58) Field of Search ................................ 320/124, 125, 320/130, 135, 155, 160, 102, 163

(56) References Cited

U.S. PATENT DOCUMENTS 4,035,709 A * 7/1977 Seider et al.

* cited by examiner

*Primary Examiner*—Edward H. Tso
(74) *Attorney, Agent, or Firm*—Katten Muchin Zavis Rosenman

(57) ABSTRACT

A charge termination circuit which may be disposed within the battery cell pack and used in conjunction with known battery safety circuits to protect against charging conditions which reduce the life of a battery cell. In particular, the charge termination circuit is adapted to be used in conjunction with an off the shelf battery safety circuit and one or more power FETs coupled between the battery cell and the battery charger terminals on the battery cell package. The charge termination circuit includes a microcontroller and monitors the battery cell voltage by way of an I/O part and activates a first timer anytime the charging current to the battery is below a predefine threshold, for example, indicative of a maintenance or trickle charge. When the first timer times out after a predetermined time period, for example, two hours, the charge termination current forces the one or more of the serially coupled FETs switches to interrupt battery charging of the battery cells. The charge termination circuit also monitors the battery cell voltage and closes the FETs to allow charging when the cell voltage falls below a predetermined level. As a second level of protection, each time the microcontroller is powered up, a second timer is activated. The second timer is set for a much longer period of time than the first timer, for example, six hours, and is used in the event that the charging current does not fall below the threshold discussed above. The second timer is used to terminate charging by switching the serially coupled power FETs off when the second timer times out. The charge termination circuit is adapted to work in conjunction with conventional battery safety circuit and provide and additional level of functionality with a battery cell package in order to provide protection against operating conditions which reduce battery cell life, heretofore unknown.

17 Claims, 3 Drawing Sheets

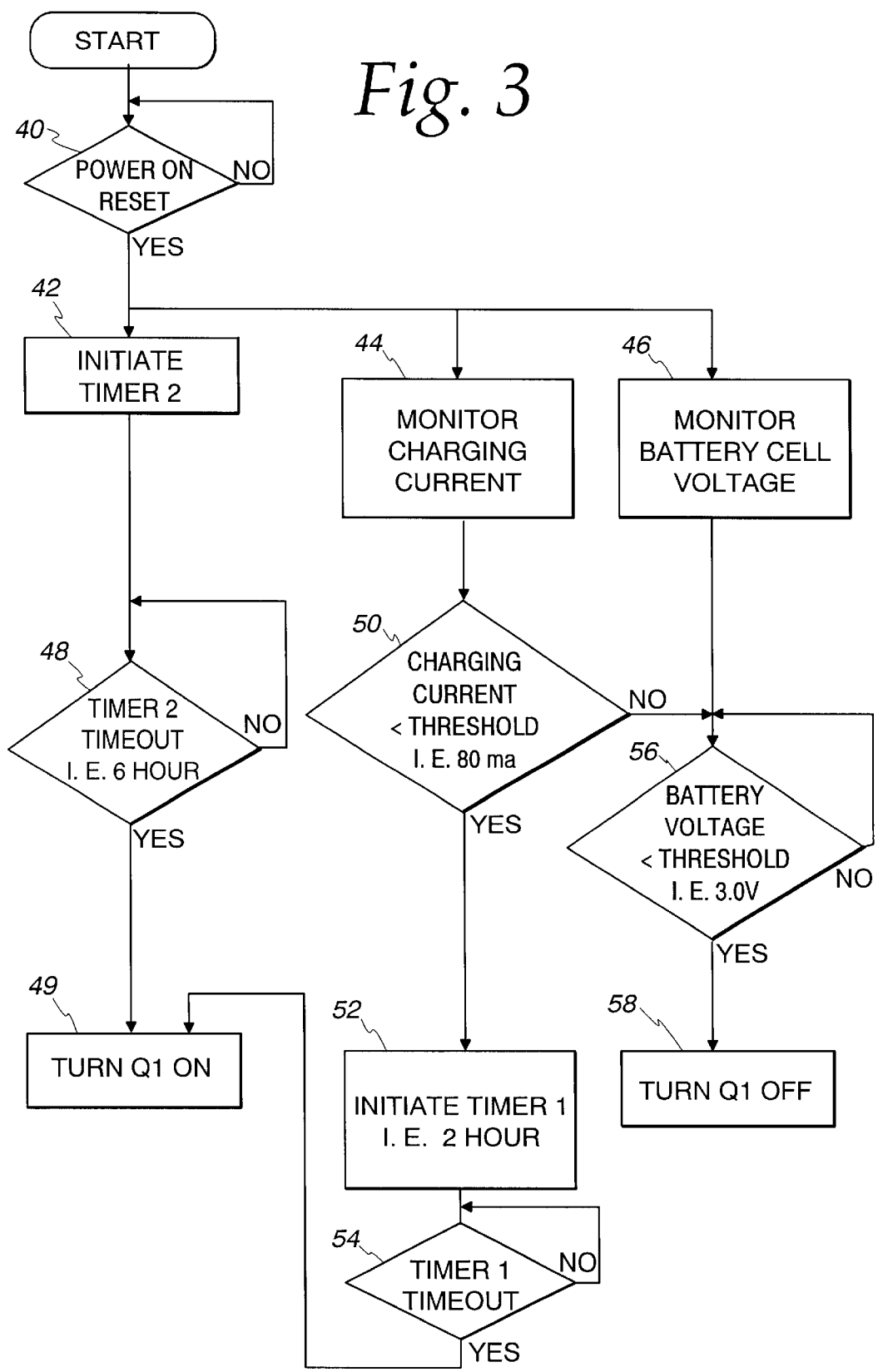

PROTECTION CIRCUIT FOR TERMINATING TRICKLE CHARGE WHEN THE BATTERY TERMINAL VOLTAGE IS GREATER THAN A PREDETERMINED VALUE

BACKGROUND OF THE INVENTION

1. Field of the Invention

The present invention relates to a battery charger termination circuit and more particularly to a battery charger termination circuit that functions in conjunction with known so called battery safety circuits which terminate battery charging after predetermined time periods under predetermined conditions to prevent battery cell damage resulting from extended battery charging cycles.

2. Description of the Prior Art

Various portable devices and appliances, such as cellular phones, require rechargeable batteries. Various types of rechargeable batteries are known to be used in such applications. For example, nickel-cadmium (NiCd), nickel metal hydride (NiMH), as well as lithium ion batteries are known to be used. Because of the different charging characteristics of such batteries, different battery chargers are required. For example, both nickel-cadmium (NiCd), as well as nickel metal hydride (NiMH) batteries, require constant current charging. On the other hand, lithium ion batteries require constant current charging up to a certain voltage value and constant voltage charging thereafter. Because of the different charging characteristics of the various battery types, different charging circuits are required. Examples of charging circuits for different battery types are disclosed in commonly-owned U.S. Pat. Nos. 5,764,030; 5,998,966 and 6,002,237, hereby incorporated by reference.

Various problems are known which can result in battery damage during battery charging. One problem is known as gassing. Gassing is a condition that occurs when a battery is charged below room temperature. More particularly, gassing relates to a build up of oxygen resulting from the chemical reaction that occurs within a battery cell during charging. When a battery is being charged below room temperature, the oxygen pressure can increase within the battery housing and exceed the limits of the housing thus causing damage to the battery cell. However, at higher temperatures, the oxygen recombines, thus reducing the risk of excessive pressure within the battery housing.

Various battery circuits have been developed to address this problem. For example, U.S. Pat. No. 4,667,143 discloses a battery charger which includes a thermistor for sensing battery temperature. The thermistor is connected in parallel with a temperature stable resistor to provide a temperature compensated battery voltage signal. The temperature compensated voltage signal is used to control the charging of the battery as a function of temperature.

Commercially available monolithic battery circuits are also known which control battery charging as a function of the battery temperature. For example, a Texas Instrument Model No. bq2057 advanced lithium ion linear charge management (IC) integrated circuit is available. This IC requires an external thermistor and is used to inhibit battery charging until the temperature of the battery is within user-defined thresholds. Thus the safety circuit can prevent charging of the battery when the temperature of the battery is below a predetermined threshold in order to prevent gassing.

Another known problem that occurs during certain charging conditions relates to overheating. Overheating occurs as a result of prolonged charging of a battery causing the temperature of the battery to increase to an unacceptable level, possibly causing damage. In order to address this problem, various battery charger circuits have been developed which limit charging times in order to reduce the possibility of overheating of the battery cell. For example, U.S. Pat. No. 4,035,709 discloses a battery charging circuit which monitors the battery voltage and terminates fast charging when the battery voltage reaches a predetermined level, for example, 80% of the desired voltage level. Once the battery reaches 80% of the desired voltage, rapid charging is terminated and a timer is enabled which allows trickle charging for a fixed period of time, for example, six hours. U.S. Pat. No. 5,727,232 also relates to a battery charger circuit which uses predetermined time periods to control charging cycles.

Due to the differences in battery charger circuits, battery manufacturers are known to incorporate battery safety circuits directly into the battery cell packages. More particularly, such battery cell packages are known to include one or more battery cells, serially connected to one or more switching devices, such as field effect transistors (FETs), which in turn, are serially coupled between the battery cell and the power supply terminals in order to interrupt charging of the battery under certain operating conditions. The FETs are under the control of a so-called battery safety circuit, usually an integrated circuit (IC), also disposed within the battery cell package. Such safety circuits are known to provide overcharge, over discharge and overcurrent protection.

Overcharge protection relates to a condition when a relatively large voltage is impressed upon the battery cell for an excessive time period. Over-discharge protection relates to a condition when the discharge current from the battery is excessive resulting in the battery voltage dropping below a predetermined voltage during a discharge mode (i.e. charger off mode). The overcurrent mode relates to a condition when the discharge current from batteries exceeds a level, indicative of a short circuit. The so called battery safety circuits monitor the discharge current and voltage in order to protect against the various conditions mentioned above. When one of the conditions, such as overcharge, over-discharge or overcurrent is sensed by the safety circuit, the safety circuit interrupts battery charging from within the battery cell, independent of the battery charger, by turning off one or more of the serially coupled FETs.

Various battery safety circuits are known. Examples of such battery safety circuits are available from Mitsumi Corporation. For example, Mitsumi Model No. MM1412 and MM1491 are battery safety circuits for use with lithium ion batteries. These devices are described in data sheets entitled: "Protection of Lithium-Ion Batteries MM1412" and "Lithium-Ion Battery Protection (for 1-cell in series) MM1491", published by Mitsumi Corporation, hereby incorporated by reference.

Use of the battery safety circuits inside of the battery cell packages thus insures a certain level of battery protection irrespective and independent of the battery charger used to charge the battery cell packages. Although the battery charger circuits and circuits discussed above provide adequate protection for the various operating conditions, those circuits do not address battery charging conditions which can result in reduced battery cell life. In particular, battery cells are known to loose capacity if a maintenance of trickle charge is continued for hours or even days following a full charge. As such, appliances which utilize, for example, lithium-ion batteries which have a reduces life are more expensive to use. Thus there is a need for a battery circuit to protect against battery charging conditions that are detrimental to the battery cell life.

SUMMARY OF THE INVENTION

Briefly, the present invention relates to a charge termination circuit which may be disposed within the battery cell pack and used in conjunction with known battery safety circuits to protect against charging conditions which reduce the life of a battery cell. In particular, the charge termination circuit is adopted to be used in conjunction with an off the shelf battery safety, safety circuit implies the FET circuit which includes one or more power FETs coupled between the battery cell and the battery charger terminals on the battery cell package. The charge termination circuit includes a microcontroller and monitors the battery cell voltage and current by way of an I/O port configured as an A/D input and activates a first timer anytime the charging current to the battery is below a predefined threshold, for example, indicative of a maintenance or trickle charge. The charging current to the battery is measured across one or more of the FETs in order to avoid introducing an additional series impedance. When the first timer times out after a predetermined time period, for example, two hours, the charge termination circuit forces the one or more of the serially coupled FETs switches to interrupt battery charging of the battery cells. The charge termination circuit also monitors the battery cell voltage and closes the FETs to allow charging when the cell voltage falls below a predetermined level. As a second level of protection, each time the microcontroller is powered up, a second timer is activated. The second timer is set for a much longer period of time than the first timer, for example, six hours, and is used in the event that the charging current does not fall below the threshold discussed above. The second timer is used to terminate charging by switching one of the serially coupled power FETs off when the second timer times out. The charge termination circuit is adapted to work in conjunction with conventional battery safety circuit and provide and additional level of functionality with a battery cell package in order to provide protection against operating conditions which reduce battery cell life, heretofore unknown.

DESCRIPTION OF THE DRAWINGS

These and other objects of the present invention will be readily understood with reference to the following specification and attached drawing:

FIG. 3 is a flow diagram for the charge termination circuits illustrated in FIG. 2.

DETAILED DESCRIPTION

The present invention relates to a charge termination circuit which monitors the charging current and terminates battery charging, for example, within the battery cell package to prevent extended maintenance or trickle charging after a battery has been fully charged in order to extend the life or capacity of the battery cells within the pack. The charge termination circuit in accordance with the present invention is adapted to work in conjunction with a known battery safety circuits known to be incorporated into battery cell packages. As will be discussed in more detail below, the charge termination circuit monitors the charging current and cell voltage to prevent extended or charging after a battery has been fully charged in order to extend the battery cell life while allowing charge resumption when the battery voltage drops below a predetermined level, for example due to self discharge. As such, additional functionality may be provided within the battery cell package independent of external battery chargers.

Figure 1:
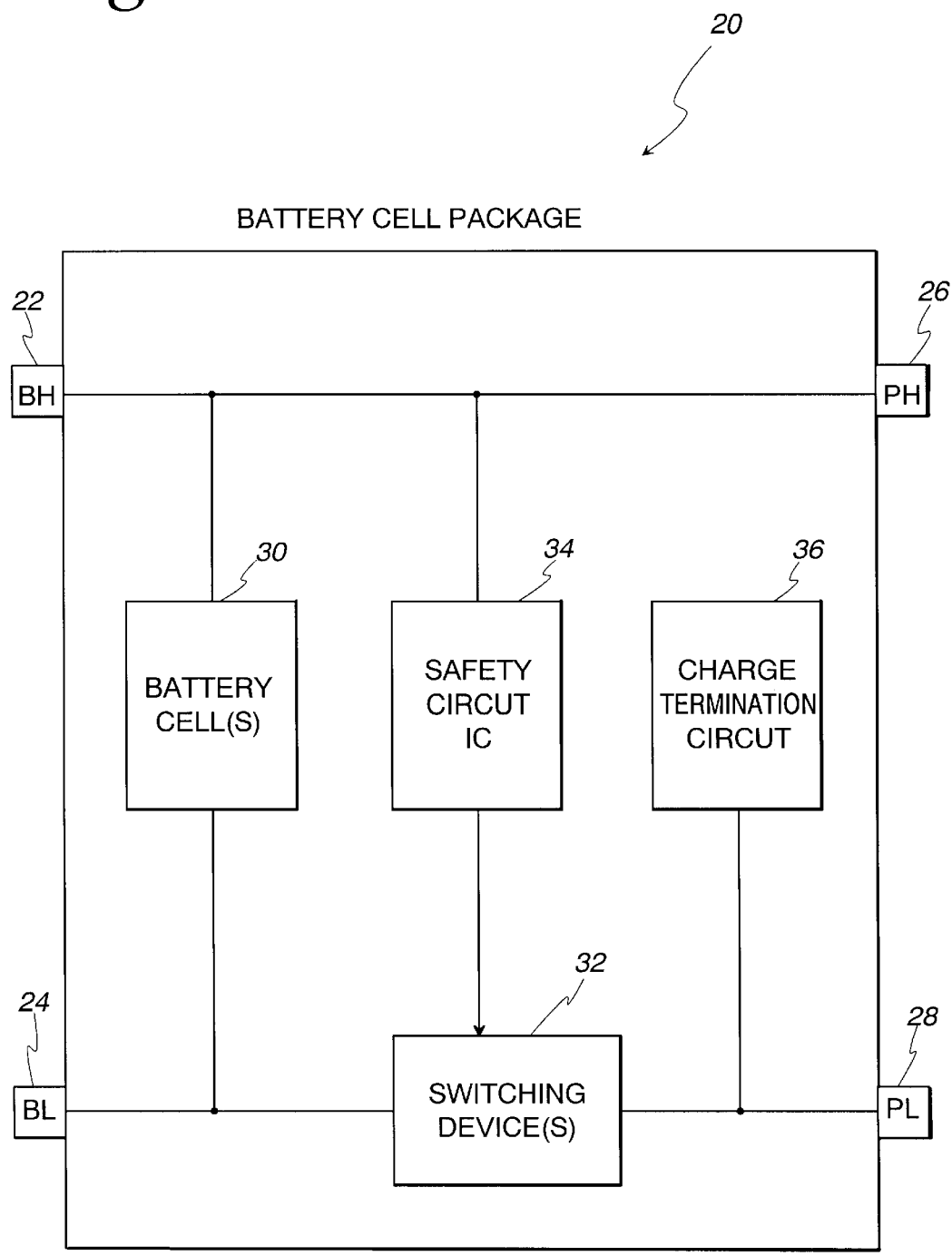
FIG. 1 is a block diagram of a charge termination circuit in an exemplary embodiment shown within a battery package.

Referring to FIG. 1, an exemplary battery cell package is shown and generally identified with the reference numeral 20. Such battery cell packages 20 are known to be used in a wide variety of portable appliances, such as cellular phones and the like. Such battery cell packages normally include two battery terminals 22 and 24, identified as "BH" and "BG". These terminals 22 and 24 are used to connect the battery cell package 20 to the portable appliance (not shown) for providing a source of DC power to the portable device in a portable mode of operation. The battery cell package 20 also includes a pair of battery charger terminal 26 and 28, identified as "PH" and "PL". The terminals 26 and 28 are used to connect the battery cell package 20 to an external battery charger (not shown) during a battery charger mode of operation.

The battery cell package 20 is normally configured as a disposable device and includes one or more battery cells, generally identified with the reference numeral 30, connected between the battery terminals 22 and 24. One or more battery cells may be provided in series or parallel depending on the voltage and current requirements of the portable appliance in which the battery cell package 20 is intended to be used. The embodiments illustrated in FIGS. 2–4 relate to exemplary battery cell packages 20 which utilize a single lithium ion battery cell. However, the principles of the present invention relate to multiple cells connected either in series and/or parallel and to virtually all battery types, including nickel cadmium (NiCd) and nickel metal hydride (NiMh) as well.

As mentioned above, many known battery cell manufactures are known to include switching devices 32 within the battery cell package 20 in order to interrupt battery charging of the battery cells 30 during certain charging conditions, which include overcharging, over discharging and overcurrent. As such, one or more switching devices 32 are normally provided between the battery terminals 22 and 24 the battery charger terminals 26 and 28 on the battery cell package 20 in order to interrupt battery charging under specified conditions as mentioned above. The switching devices 30 are known to be under the control of a battery safety circuit 34 which monitors the battery voltage and current conditions in order to control the switching devices 32.

In accordance with the invention, a charge termination circuit 36 is provided which provides protection independent of an external battery charger against charging conditions which tend to reduce the cell life of the battery cell 30. As mentioned above, these conditions include maintaining a trickle or maintenance charge on a battery for an extended period of time (i.e. over two hours) after the battery cells have been fully charged. As such, the charge termination circuit 36 provides additional functionality heretofore unknown, independent of external battery chargers. The charge termination circuit 36, as will be discussed in more detail below, works in independently of the battery safety circuit 34 to inhibit charging by turning off the switching devices 32, when such a battery life diminishing charging condition is detected while enabling the full functionality of the battery safety circuit 34.

Figure 2:
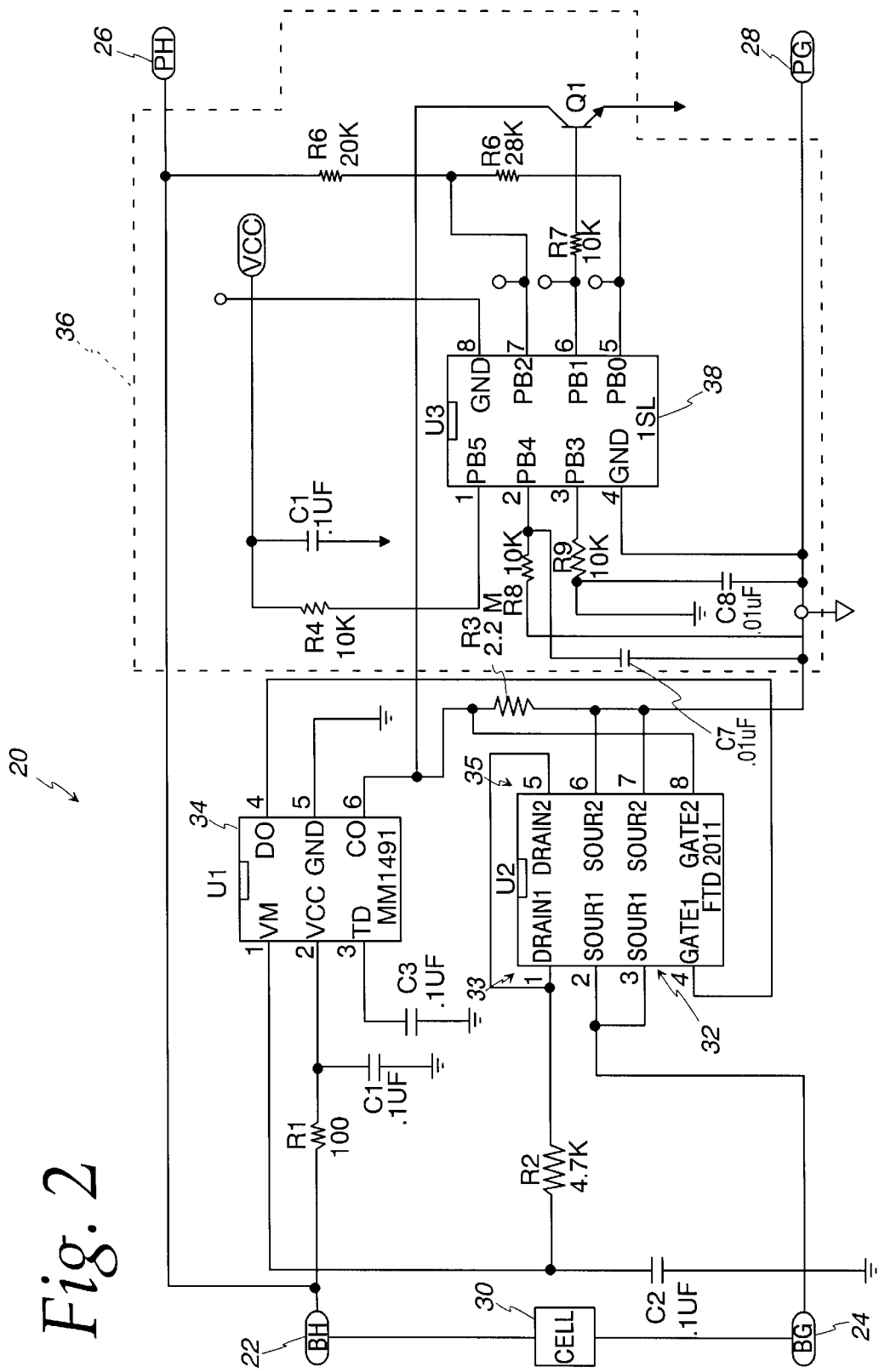
FIG. 2 is a schematic diagram of a first exemplary embodiment of the charge termination circuit shown coupled to an off the battery safety circuit and a pair of serially coupled FETs.

Turning to FIG. 2, a schematic diagram of an exemplary battery cell package internal circuit is illustrated. As discussed above, one or more battery cells 30 are typically coupled between the battery terminals 22 and 24, either in series and/or parallel. The battery cell package circuit includes a battery safety circuit 34 and a pair of serially coupled switching devices 32. In this exemplary embodiment, the battery safety circuit IC 34 is a Mitsumi Model No. MM1491, normally used for a signal cell lithium-ion battery cell. The battery safety circuit 34 is described in detail in Mitsumi data sheets entitled; "Lithium-Ion Battery Protection (for 1 cell in series) Monolithic IC MM1491", herein incorporated by reference.

In order to fully understand the charge termination of circuit 36, a brief description of the operation of the battery safety circuit 34 and switching devices 32 is provided. In particular, a pair of switching devices 32, implemented as a pair of power field effect transistors (FETs), are serially connected between the battery terminal 24 and the battery charger terminal 28. The power FETs 32 may be, for example, Sanyo model FTD2011, described in Sanyo data sheets entitled, "FTD2011 Load Switching Applications", hereby incorporated by reference. The power FETs 32 are under the control of the safety circuit 34. Referring to FIG. 2, two FETs are provided in series and identified with the reference numerals 33 and 35. One FET 33 is used for discharge control while the other FET 35 issued for charge control.

The safety circuit IC 34 monitors the battery voltage by way of its VCC pin 2. In particular, the battery terminal 22 is connected to a VCC pin 2 on the safety circuit 34 by way of a resistor R1. When the voltage at the VCC pin exceeds a predetermined value, for example 4.35±.025 volts, the CO pin on the battery safety circuit 34 turns off the discharge FET 35 by way of the resistor R3. The resistor R3 is connected between the gate and source terminals of the FET 35 in order to reduce the cut off time of the FET 35, resulting from gate to source capacitance.

The battery safety circuit 34 also provides for over discharge protection by monitoring the voltage of a battery terminal by way of the VCC pin. During this condition, the battery safety circuit 34 monitors the battery voltage level and if it drops below a predetermined threshold for example 2.4 volts, the DO pin on the battery safety circuit 34 turns off the FET 33. This protection is accomplished by monitoring the discharge current of the battery. The discharge current is sensed by measuring the voltage on the VM pin on the fall safety circuit. The discharge current is equal to the battery voltage divided by the on resistance of the two power FETs 33 and 35. The over discharge protection is activated anytime the discharge current is, for example, 200±26 millivolts.

Lastly, the safety circuit IC provides over current protection. When an over current condition is detected, the DO pin on the safety circuit IC is activated to turn off one of the power FETs in order to interrupt discharging.

The charge termination circuit 36 in accordance with the present invention is shown in FIG. 2, within the dashed box, identified with the reference numeral 36. In accordance with an important aspect of the invention, the charge termination circuit 36 is adapted to work in conjunction with the battery safety circuit 34 to provide additional functionality within a battery cell package 20. The charge termination circuit 36 includes a microcontroller 38, for example, an 8-bit microcontroller with a reduced instruction set (RISK) architecture. Various microcontrollers are suitable for this application. An ATMEL, Model No. ATtiny 15 L is illustrated. The ATMEL microcontroller is described in detail in an ATMEL publication entitled; "8 bit AVR Microcontroller with IK Bytes Flash Advance information, revision 1187B-03/00, pages 1–54, hereby incorporated by reference. The microcontroller 38 includes a 6-bit input/output (I/O) port an on-board analog to digital converter (ADC) and two timers. The micrcocontroller 38 is used to monitor current and cell voltage. In particular, port PB4 is used for measuring the charge of the battery by way of the power FETs 32. In particular, port bit PB4 is connected to the source terminal 6 and 7 of the power FET 35. The voltage of the source terminals 6 and 7 of the FET 35, divided by the on resistance for the two serially coupled FETs 32, represents the charging current to the battery. In case of the power FETs 32 discussed above, each has an on resistance of 30 milliohms for a total of 60 milliohms. Assuming a trickle charge current of about 80 milliamps, the voltage will be about 4.8 millivolts. Thus, 4.8 millivolts may be used as a threshold value for determining when the external battery charger is providing a trickle charge to the battery cells 30. As such, when the voltage at port bit PB4 drops below 4.8 millivolts, the microcontroller 38 assumes a trickle charge condition and enables first internal timer on the microcontroller 38.

The internal timer is used to control the amount of time the external battery charger applies a trickle charge to the battery 30 after the battery cell has been fully charged. Thus, the first internal timer may be set for example for two hours. In accordance with an important aspect of the invention, anytime the voltage at port bit PB4 drops below, for example, 4.8 millivolts, indicative of a trickle charge being supplied to the battery cell 30, the first internal timer this condition and at the end of a time out period, for example, two hours, the microcontroller 38 generates a termination signal, i.e. applies a logical one to the port bit PB1 by way of a resistor R7, which, in turn, turns on a transistor Q1. The transistor Q1 may be a bipolar transistor with its emitter connected to ground and collector connected to the CO pin 34 on the battery safety circuit 34. When the transistor Q1 turns on, it forces the CO pin to go low, which in, turn, turns off the charging FET 35, thus interrupting the charging from the external battery charger during this condition. During this time, the battery cell voltage at terminal 22 is continuously monitored by the port bit PB4 by way of the resistor R5. Thus, when this voltage drops below a pre-set level, for example 3.9 volts, due to self-discharge, the transistor Q1 is turned off by way of the port PB1 to allow charging of the battery cells 30 to resume.

As mentioned above, the microcontroller 38 includes an on-board ADC Port PB0 serves as a reference for the internal ADC within the microcontroller 38. As such, the port bit PB0 is connected to the battery charger terminal 26 by way of the resistor R5 and a resistor R6.

For single cell batteries, an unregulated DC supply, such as from an automobile cigarette lighter, is sufficient as a power supply. As such, the unregulated supply may be connected directly to the VCC pin on the microcontroller 38. In this way, portable appliances can be charged in an automobile with a simply a cigarette lighter adapter thus obviating the need for a separate battery charger. For multiple cell batteries, a regulated supply may be required.

In accordance with another aspect of the invention, the charge termination circuit 36 provides a second level of protection which interrupts charging of the battery cells 30 after an extended period of time, for example 6 hours. In particular, the power supply VCC which, as discussed above, may simply be a cigarette lighter adapter in a vehicle, is connected to a reset port pin PB5 on the microcontroller 38. In that case, the port pin PB5 may be connected directly to the terminal 26. Thus, each time the microcontroller 38 is powered up and voltage is sensed on the reset port pin PB5, a second internal timer within the microcontroller 38 is enabled. The second timer may be provided with a second relatively longer time out period, for example, 6 hours. Thus, battery charging will be interrupted independent of any external battery charger 6 hours after charging is initiated. When the second timer times out, a termination signal is generated, i.e. the port pin B1 drives the transistor Q1 to an on condition, which turns off the charging FET 35. The second level of protection may be used for the condition when the charging current to the battery cells 30 does not fall below the 80 milliamp threshold, as discussed above.

The discharge FET 33 may be under the control of the battery safety circuit 34. The discharge FET 33 is thus turned off during over-discharge and overcurrent conditions as discussed above.

A flow chart for the microcontroller 38 is illustrated in FIG. 3. Initially, prior to the power supply voltage being applied to the battery cell 30, the system waits for the application of power supply voltage. As discussed above, once a power supply voltage is supplied to the battery charger terminals 26 and 28 the microcontroller 38 resets as indicated in step 40. After the microcontroller 38 resets the a second internal timer two is enabled in step 42. In addition, the system monitors the battery charging current in step 44 and the battery cell voltage in step 46. The system then checks in step 48 whether the second timer has timed out. As indicated above, the second timer may be set at a relatively long time period, for example 6 hours. Once the timer two times out, the transistor $Q_1$ (FIG. 2) is turned on which causes the power FET 35 to turn off and interrupt charging of the battery cells 30 (FIG. 1).

As mentioned above, while the second timer is timing, the system monitors the charging current and the battery cell voltage in steps 44 and 46. Should the charging current drop below a threshold, for example, 80 milliamps, as determined in step 50, the system initiates a first timer. The 80 milliamp level is set as a threshold level for determining when a trickle voltage has been applied to a lithium-ion battery cell after full charge. The time out period for the first timer is set at a relatively short time period, for example, two hours. Once the first timer times out, as indicated in step 54, the system precedes to step 49 and turns the transistor Q1 on to interrupt battery charging. Should the charging current not drop below 80 milliamps, the system checks in step 56 to determine if the battery cell voltage has dropped below a predetermined threshold value, for example 3.9 volts, due to self-discharge. Should this condition occur, the system turns off transistor Q1 in step 58.

The system can also be configured to operate without the safety circuit 34 (FIG. 2). In such an embodiment, a port PB1 on pin 6 of the microcontroller 38 can simply be used to control the power FETs 33 and 35 directly.

Obviously, many modifications and variations of the present invention are possible in light of the above teachings. Thus, it is to be understood that, within the scope of the appended claims, the invention may be practiced otherwise than as specifically described above.

What is desired to be secured by a Letters Patent is as follows:

1. A battery circuit for extending the life of a battery cell comprising:
   a device for sensing the charging current to a battery cell and determining when the charging current is at a level indicative of a trickle charge; and
   a timer for measuring the time period during which a trickle cell charging current is applied to the battery cell and generating a termination signal for terminating charging of the battery cell after a first predetermined time period, wherein said circuit also includes a device for measuring the battery cell voltage and overriding said termination signal when said battery voltage drops below a predetermined value.

2. The battery circuit as recited in claim 1, further including a second timer which is enabled anytime power is applied to said battery circuit and generates a termination signal after a second predetermined time period.

3. The battery circuit as recited in claim 2, wherein said first predetermined time period is shorter than said second predetermined time period.

4. The battery circuit as recited in claim 3, wherein said first predetermined time period is two hours.

5. The battery circuit as recited in claim 4, wherein said second predetermined time period is 6 hours.

6. The battery circuit as recited in claim 1, wherein said battery circuit includes a microcontroller.

7. A charge control circuit for one or more battery cells comprising:
   a first and second battery terminal;
   a first and second battery charger terminal;
   one or more switching devices connected between one of said battery terminals and one of said battery charger terminals;
   a battery safety circuit for controlling said one or more switching devices under first predetermined conditions; and
   a charge termination circuit for controlling said one or more switching devices under second different predetermined conditions.

8. The charge control circuit as recited in claim 7, wherein said charger termination circuit includes a device for sensing the charging current to a battery cell and determining when the charging current is a level indicative of a trickle charge; and
   a timer for measuring the time period during which a trickle charging current is applied to the battery cell and generating a termination signal for terminating charging of the battery cell after a first predetermined time period.

9. The charge control circuit as recited in claim 7, wherein said charge control circuit also includes a device for measuring the battery cell voltage and overriding said termination signal when said battery voltage drops below a predetermined value.

10. The battery circuit as recited in claim 7, further including a second timer which is enabled anytime power is applied to said battery circuit and generates a termination signal after a second predetermined time period.

11. The battery circuit as recited in claim 7, wherein said first predetermined time period is shorter than said second predetermined time period.

12. The battery circuit as recited in claim 7, wherein said first predetermined time period is 2 hours.

13. The battery circuit as recited in claim 7, wherein said second predetermined time period is 6 hours.

14. The battery circuit as recited in claim 7, wherein said battery circuit includes a microcontroller.

15. The charge control circuit as recited in claim 7, wherein said switching devices include one or more FETs.

16. The charge control circuit as recited in claim 7, wherein said first predetermined conditions include one or more of the following conditions; overcharge, overdischarge or overcurrent.

17. The charge control circuit as recited in claim 6, wherein said second predetermined conditions include extended trickle charging.

* * * * *

UNITED STATES PATENT AND TRADEMARK OFFICE
CERTIFICATE OF CORRECTION

PATENT NO. : 6,456,046 B1
DATED : September 24, 2002
INVENTOR(S) : Brian Scott Gaza It is certified that error appears in the above-identified patent and that said Letters Patent is hereby corrected as shown below:

<u>Column 3,</u>
Line 13, please delete "safety,".

<u>Column 8,</u>
Line 33, after "is", please add -- at --.

Signed and Sealed this

Twenty-seventh Day of January, 2004

JON W. DUDAS
*Acting Director of the United States Patent and Trademark Office*